July 29, 1941.　　　F. E. HUMMEL　　　2,250,709
AUXILIARY HANDLE
Filed Oct. 28, 1940
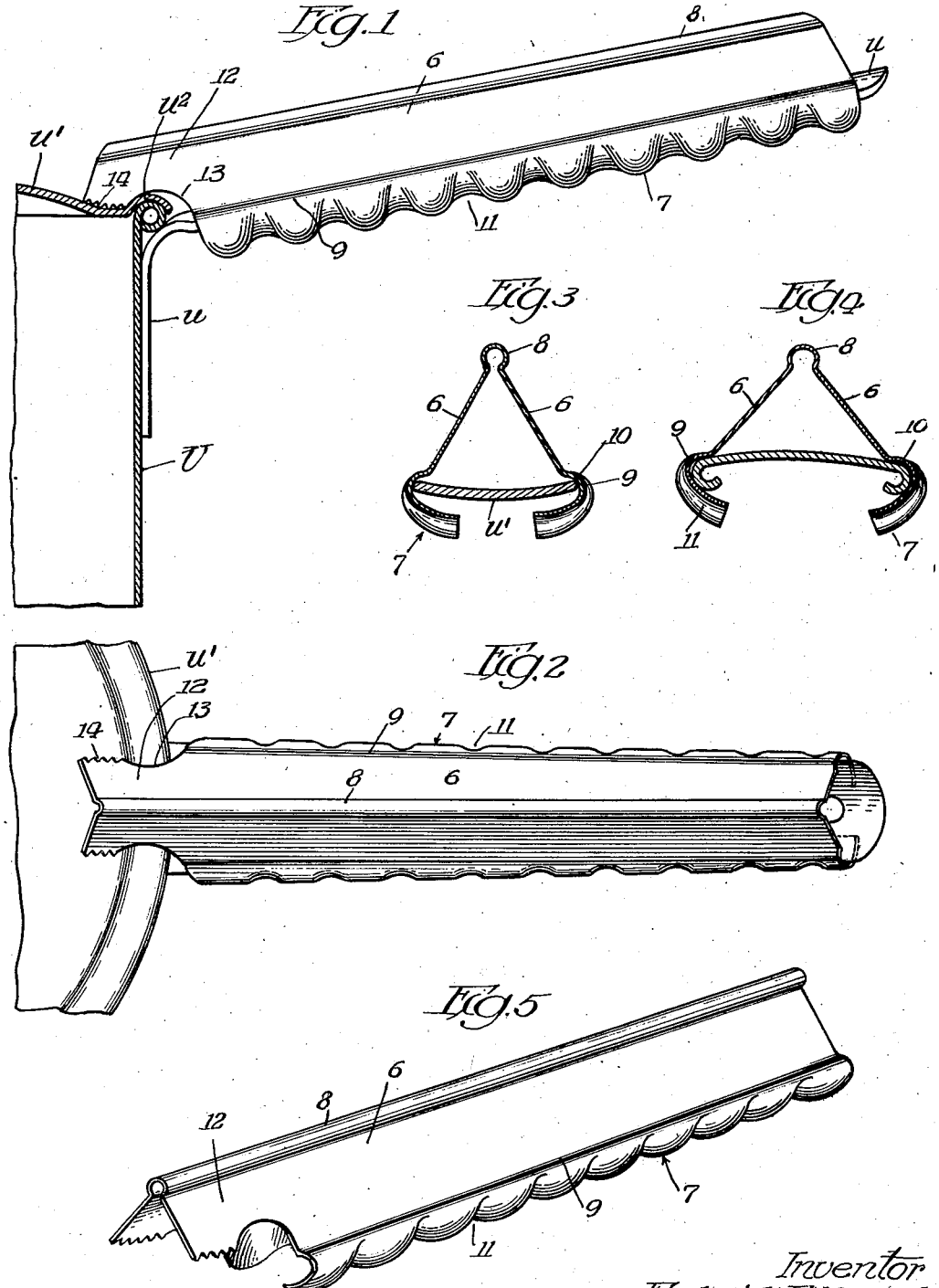
Inventor
Frederick E. Hummel
By Thed Gerlach
his Atty.

Patented July 29, 1941

2,250,709

UNITED STATES PATENT OFFICE 2,250,709

AUXILIARY HANDLE

Frederick E. Hummel, Chicago, Ill.

Application October 28, 1940, Serial No. 363,100

13 Claims. (Cl. 53—8)

The present invention relates generally to auxiliary handles. More particularly the invention relates to that type of auxiliary handle which is especially designed to be slid around, and into gripping relation with, the outwardly projecting side handle of a pot type cooking utensil when it is desired to move the utensil from place to place and the utensil is in such a heated condition that the handle thereof cannot be comfortably gripped by the hand, and serves when in use, i. e., in connected relation with the handle of the utensil, as a heat insulator for the hand and also to facilitate gripping and subsequent manipulation of the utensil.

One object of the invention is to provide an auxiliary handle of this type which is generally of new and improved construction and is so simple in design that it may be produced at an extremely low cost.

Another object of the invention is the provision of an auxiliary handle comprising a pair of complemental oppositely positioned elongated side pieces which are downwardly divergent, have inturned flanges along the bottom margins thereof for underlying the side margins of a cooking utensil handle and are connected together at the top margins thereof so that when gripped they may be flexed inwards into gripping relation with the handle.

Another object of the invention is to provide an auxiliary handle of the last mentioned type and character in which the oppositely disposed or positioned side pieces are formed of sheet metal and are connected together along the top margins thereof by way of an integral full length three-quarter round loop and hence they are free for such lateral flexing that they may be readily manipulated or flexed into gripping relation with utensil handles of different sizes and shapes.

Another object of the invention is to provide an auxiliary handle of the type and character under consideration in which the sheet metal side pieces are connected to the inturned flanges by way of full length semi-cylindrical loops which are exteriorly disposed and are adapted when the auxiliary handle is in its operative or gripping position with respect to the handle of a utensil to receive the side margins of the utensil handle in such manner that the utensil handle is locked against turning or angular displacement relatively to the auxiliary handle.

A further object of the invention is to provide an auxiliary handle of the aforementioned type in which the inturned flanges along the bottom margins of the downwardly divergent side pieces are transversely corrugated in order to form exterior pockets for the fingers of the user of the handle and thus prevent slipping of the auxiliary handle with respect to the user's hand.

A still further object of the invention is to provide an auxiliary handle which is an improvement upon, and has certain advantages over, previously designed handles of the same general character and embodies at the inner end thereof a finger which is adapted when the auxiliary handle is in gripping relation with the handle of a utensil having a cover to grip or engage the cover and hold it against accidental displacement during movement of the utensil from one place to another.

Other objects of the invention and the various advantages and characteristics of the present auxiliary handle will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a fragmentary section of a handle-equipped pot-type cooking utensil having applied to the handle thereof an auxiliary handle embodying the invention;

Figure 2 is a plan view showing the auxiliary handle while under compression and in gripping relation with the handle of the utensil;

Figure 3 is a vertically transverse section illustrating the manner in which the substantially semi-cylindrical external loops between the inturned flanges and the bottom margins of the side pieces of the auxiliary handle are arranged in interlocked relation with the utensil handle when the auxiliary handle is in its operative position.

Figure 4 is a similar vertical transverse section showing the auxiliary handle in gripping relation with a different utensil handle; and Figure 5 is a perspective of the auxiliary handle illustrating in detail the manner in which the inturned flanges are transversely corrugated to provide external finger receiving pockets.

The auxiliary handle which is shown in the drawing constitutes the preferred embodiment of the invention. It is illustrated in connection with a cooking utensil U and as its main or principal parts comprises a pair of complemental oppositely positioned side pieces 6 and a pair of inturned flanges 7. The utensil U is in the nature of a standard pot and has a handle $u$ and a cover $u^1$. One end of the handle is riveted or otherwise fixedly secured to the upper portion of the utensil U. The other or outer end of the handle extends outwards and slightly upwards relatively to the utensil U and is adapted to be gripped in connection with movement of the utensil from place to place. The outer end of the handle $u$ is outwardly tapered, as shown in Figure 2, and is dished or downwardly bowed in cross section for strengthening purposes. The upper margin of the utensil U is in the form of an annular bead $u^2$ and this serves as a supporting medium for the cover $u^1$ and overlies the point of juncture between the inner and outer ends of the handle $u$.

The auxiliary handle is preferably in the form of a one piece metallic stamping. It is adapted, as hereinafter described, to be slid around, and into gripping relation with, the handle $u$ of the utensil U and serves as a comfortable gripping medium for the outer end of the handle $u$ as well as a heat insulator between the user's hand and the handle, especially when the utensil U is in a heated condition and it is hence impossible or impractical to grip the handle $u$ in connection with the utensil U being moved from place to place. The side pieces 6 of the auxiliary handle are complemental and the same in length and height. They are downwardly divergent and have along the top margins thereof an integral three-quarter round externally disposed connecting loop 8. The latter extends from one end of the auxiliary handle to the other and forms what may be considered or termed a resilient hinge type joint between the two side pieces whereby the latter are permitted to flex to and from one another in conjunction with manipulation of the auxiliary handle into gripping relation with the outer end of the handle $u$ of the utensil. The side pieces 6 are preferably maintained or held by the loop 8 at an angle of 60°. The loop, however, is sufficiently resilient or flexible so that the side pieces may be swung apart in order to accommodate a wide utensil handle, as shown in Figure 4. When a utensil handle of small width is encountered, such for example as the handle $u$, the side pieces are flexed together by gripping them while at the same time applying inward pressure.

The flanges 7 extend along, and project inwardly from, the bottom margins of the side pieces 6 and are adapted to underlie the side margins of the utensil handle when the auxiliary handle is in its operative position (see Figure 3). They are connected to the bottom margins of the side pieces 6 by semi-cylindrical exteriorly disposed integral loops 9 and are transversely corrugated from one end thereof to the other, as best shown in Figures 1 and 5. The loops 9 define inwardly facing oppositely positioned pockets 10 along the bottom margins of the side pieces 6 and these pockets are adapted to receive the side margins of the utensil handle and so to interlock with such side margins that the utensil handle and the auxiliary handle are effectively held against turning or lateral displacement one relatively to the other. By having the side margins of the utensil handle disposed in interlocked relation with the pockets 10 when the auxiliary handle is in its operative position there is no likelihood of the utensil tilting or the auxiliary handle turning with respect to the utensil handle in connection with manipulation of the utensil from place to place by use of the auxiliary handle. The transversely extending corrugations in the inturned flanges 7 form exterior finger pockets 11 for the fingers of the user of the auxiliary handle. When the fingers are seated in these pockets the user's hand cannot slip or move lengthwise of the auxiliary handle. When the auxiliary handle is to be used in connection with movement of the utensil U from place to place it is gripped by the user, as shown by dotted lines in Figure 2. Gripping of the auxiliary handle is effected by placing the palm of the hand across the three-quarter round exteriorly disposed loop 8 and then moving the fingers inwards around the inturned flanges 7. When the hand is in gripping relation with the auxiliary handle the handle may be brought into its operative position with respect to the utensil handle merely by sliding it into telescopic relation with the outer end of the handle $u$. When the auxiliary handle is in place inward pressure on the inturned flanges 7 or the semi-cylindrical connecting loops 9 serves to bring the loops 9 into contacting relation with the side edges of the handle. When the loops 9 are in such relation the utensil handle is firmly gripped by the auxiliary handle and, because of the interlocking connection between the side edges of the handle and the pockets 10, it is held against transverse tilting or rotation relatively to the auxiliary handle. When the auxiliary handle is in place air is free to circulate through the space directly above the utensil handle and between the inner faces of the side pieces 6. Any circulation of air through such space serves to maintain the auxiliary handle in a cool condition. The loop 8 between the top margins of the side pieces 6 permits of such ready inward flexure of the side pieces 6 that the latter when urged or contracted inwards will conform to the shape of an outwardly tapered utensil handle, as shown in Figure 2.

A finger 12 of U-shape cross section is connected to, and forms a part of, the inner end of the auxiliary handle. This finger, when the auxiliary handle is in its operative position with respect to the handle $u$ of the utensil U, is adapted to overlie and grip the adjacent marginal portion of the utensil cover $u^1$ and serves to lock or hold the cover against accidental displacement with respect to the utensil U. The inner portion of the finger 12 is provided at the sides thereof with cutouts 13 in order to accommodate the adjacent portion of the outrolled bead $u^2$ along the upper margin of the utensil U when the auxiliary handle is in place. Downwardly extending teeth 14 are formed on the outer extremity of the finger 12 and these serve frictionally to grip the top face of the cover $u^1$ and prevent slipping or skidding of the cover with respect to the finger.

The herein described auxiliary handle, due to its simplicity of construction and design may be manufactured at an extremely low cost. It effectively and efficiently fulfills its intended purpose and is characterized by the fact that it is adapted for quick and ready application to utensil handles of different sizes and shapes. By reason of the fact that the auxiliary handle includes the externally disposed three-quarter integral loop 8, the side pieces 6 may be flexed inwards or outwards with but a comparatively small amount of force. Removal of the auxiliary handle from a utensil handle may be accomplished readily and expeditiously since it is predicated upon mere release of the inturned flanges 7 and sliding movement of the auxiliary handle relatively to the utensil handle. By reason of the fact that the inturned flanges 7 for underlying the side margins of the utensil handle are connected to the bottom margins of the side pieces 6 by way of the semi-cylindrical loops 9 the auxiliary handle when in its operative position is effectively locked against transverse turning relatively to the utensil handle. The present auxiliary handle may be applied and removed with facility and does not rapidly or quickly acquire heat when in engagement or gripping relation with a heated utensil handle because it contacts the utensil handle along two lines only and is shaped to provide sufficient circulation of air therethrough. Durability and practicability are both attributes of the improved auxiliary handle.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture an auxiliary handle adapted for use in connection with a utensil having an outwardly projecting handle, and comprising a pair of opposed downwardly divergent side pieces having gripping means at the bottom margins thereof and embodying along and between their top margins a bend for permitting them to be flexed laterally in order to bring the gripping means into gripping relation with the side margins of the utensil handle.

2. As a new article of manufacture an auxiliary handle adapted for use with a utensil having an outwardly projecting handle, and comprising a pair of opposed downwardly divergent side pieces adapted to be slid into overlying relation with the utensil handle and having gripping means at their bottom margins for the side margins of the utensil handle and also having a loop-like bend along and between their top margins whereby they may be flexed laterally in order to bring the gripping means into gripping relation with said side margins of the utensil handle.

3. As a new article of manufacture an auxiliary handle adapted for use with a utensil having an outwardly projecting handle, and comprising a pair of opposed downwardly divergent sheet metal side pieces having gripping means along their bottom margins and embodying along and between their top margins an integral full length externally disposed substantially three-quarter round loop for permitting them to be flexed laterally in order to bring the gripping means into gripping relation with the side margins of the utensil handle.

4. As a new article of manufacture an auxiliary handle adapted for use with a utensil having an outwardly projecting handle, and comprising a pair of opposed downwardly divergent side pieces adapted to be slid longitudinally into overlying relation with the utensil handle and having inturned flanges along their bottom margins for underlying the side margins of the utensil handle and also having along and between their top margins a resilient bend whereby they may be flexed inwards in order to bring the junctures between their bottom margins and the flanges into clamped relation with the side edges of the utensil handle.

5. As a new article of manufacture an auxiliary handle adapted for use with a utensil having an outwardly projecting handle and comprising a pair of opposed downwardly divergent side pieces adapted to be slid longitudinally into overlying relation with the utensil handle and having inturned flanges along their bottom margins for underlying the side margins of the utensil handle and also having along and between their top margins an externally disposed substantially three-quarter round loop whereby they may be flexed laterally in order to bring the junctures between their bottom margins and the flanges into clamped relation with the side edges of the utensil handle.

6. As a new article of manufacture a one piece stamped metal auxiliary handle adapted for use with a utensil having an outwardly projecting handle, and comprising a pair of opposed coextensive downwardly divergent side pieces adapted to be slid longitudinally into overlying relation with the utensil handle and having full length inturned flanges along their bottom margin for underlying the side margins of the utensil handle and also having along and between their top margins a full length externally disposed substantially three-quarter round loop whereby they may be readily flexed laterally in order to bring the junctures between their bottom margins and the flanges into clamped relation with the side edges of the utensil handle.

7. As a new article of manufacture an auxiliary handle adapted for use with a utensil having an outwardly projecting handle, and comprising a pair of opposed horizontally elongated downwardly divergent side pieces adapted to be slid longitudinally into overlying relation with the utensil handle and having at their bottom margins inturned flanges for underlying the side margins of the utensil handle and in addition outwardly bulged bends between said bottom margins and the flanges for receiving and interlocking with the side edges of the utensil handle, said side pieces having along and between their top margins a resilient bend whereby they may be flexed inwards in order to bring the flanges and bends into place with respect to the utensil handle.

8. As a new article of manufacture an auxiliary handle adapted for use with a utensil having an outwardly projecting handle, and comprising a pair of opposed horizontally elongated downwardly divergent side pieces adapted to be slid longitudinally into overlying relation with the utensil handle and having at their bottom margins full length inturned flanges for underlying the side margins of the utensil handle and in addition full length externally disposed substantially semi-cylindrical bends between said bottom margins and the flanges for receiving and interlocking with the side edges of the utensil handle, said divergent side pieces having along and between their top margins a resilient bend whereby they may be flexed inwards in order to bring the flanges and bends into place with respect to the utensil handle.

9. As a new article of manufacture an auxiliary handle adapted for use with a utensil having an outwardly projecting handle, and comprising a pair of opposed horizontally elongated downwardly divergent side pieces adapted to be slid longitudinally into overlying relation with the utensil handle and having at their bottom margins full length inturned flanges for underlying the side margins of the utensil handle and in addition full length externally disposed substantially semi-cylindrical bends between the bottom margins and the flanges for receiving and interlocking with the side edges of the utensil handle, said side pieces having along and between their top margins full length externally disposed substantially three-quarter round resilient loops whereby they may be flexed laterally in order to bring the flanges and the semi-cylindrical bends into place with respect to the utensil handle.

10. As a new article of manufacture an auxiliary handle adapted for use with a utensil having an outwardly projecting handle, and comprising a pair of exteriorly opposed downwardly divergent side pieces adapted to be slid longitudinally and into overlying relation with the utensil handle and having inturned transversely corrugated flanges along their bottom margins for underlying the side margins of the utensil handle and also having along and between their top margins a resilient bend whereby they may be flexed laterally in order to bring the flanges into place with respect to the side margins of the utensil handle.

11. As a new article of manufacture an auxiliary handle for use in connection with a pot type utensil having an outwardly projecting handle and a cover, and adapted when in use to be slid onto and around the utensil handle and having means at its inner end for engaging and holding the cover on the utensil.

12. As a new article of manufacture an auxiliary handle for use in connection with a pot type utensil having an outwardly projecting handle and a cover, and adapted when in use to be slid onto and around the utensil handle and having at its inner end a hook type finger adapted when the auxiliary handle is in place to engage the utensil cover and hold it against displacement.

13. As a new article of manufacture an auxiliary handle for use in connection with a pot type utensil having an outwardly projecting handle and a removable cover, and comprising a pair of opposed downwardly divergent side pieces adapted to be slid longitudinally into overlying relation with the utensil handle and having at the bottom margins thereof gripping means and at their top margins a resilient bend for permitting them to be flexed laterally in order to bring the gripping means into gripping relation with the side margins of the utensil handle, the inner ends of the side pieces being extended to form a hook type finger adapted, when the auxiliary handle is in place, to engage the cover of the utensil and hold it against accidental displacement.

FREDERICK E. HUMMEL.